United States Patent [19]

Schaefer et al.

[11] 3,904,073
[45] Sept. 9, 1975

[54] COFFEE MAKER COVER RETAINING MEANS

[75] Inventors: George Henry Schaefer, Wauwatosa; John Herbert Elger, Milwaukee, both of Wis.

[73] Assignee: Oster Corporation, Milwaukee, Wis.

[22] Filed: Dec. 17, 1973

[21] Appl. No.: 425,316

[52] U.S. Cl. .............. 220/318; 220/94 A; 220/326
[51] Int. Cl.² ........................................ B65D 45/00
[58] Field of Search ............ 220/24, 40 S, 40 R, 32, 220/94, 55.7, 318, 326; D7/60, 62, 64, 65; 222/465, 469, 470, 472, 473, 474; 215/244, 245

[56] References Cited
UNITED STATES PATENTS

| 200,191 | 2/1878 | Griffin | 215/245 |
| 219,459 | 10/1879 | Godfrey | 215/245 |
| 517,968 | 4/1894 | Thatcher | 215/245 |
| 2,287,582 | 6/1942 | Weeks | 222/470 |
| 2,594,467 | 4/1952 | Lynch | 215/245 |
| 2,626,088 | 1/1953 | Polivka | 222/465 |
| 2,944,691 | 7/1960 | Serio | 220/36 |
| 2,950,847 | 8/1960 | Tupper | 222/465 |
| 3,130,856 | 4/1964 | Gits | 220/94 A |
| 3,558,023 | 1/1971 | Yoshito | 220/94 |

FOREIGN PATENTS OR APPLICATIONS

| 323,508 | 10/1957 | Switzerland | 220/293 |

Primary Examiner—William I. Price
Assistant Examiner—Ro E. Hart
Attorney, Agent, or Firm—George R. Clark; Neil M. Rose; John S. Pacocha

[57] ABSTRACT

A coffee maker having a mouth formed by generally cylindrical sidewalls which receive a cover spaced at one edge from the sidewalls to provide a pouring opening. Latch means are provided for the cover including a laterally extending leg which extends into engagement with the handle to stabilize the cover which is held at only one position on the periphery.

7 Claims, 4 Drawing Figures

PATENTED SEP 9 1975  3,904,073
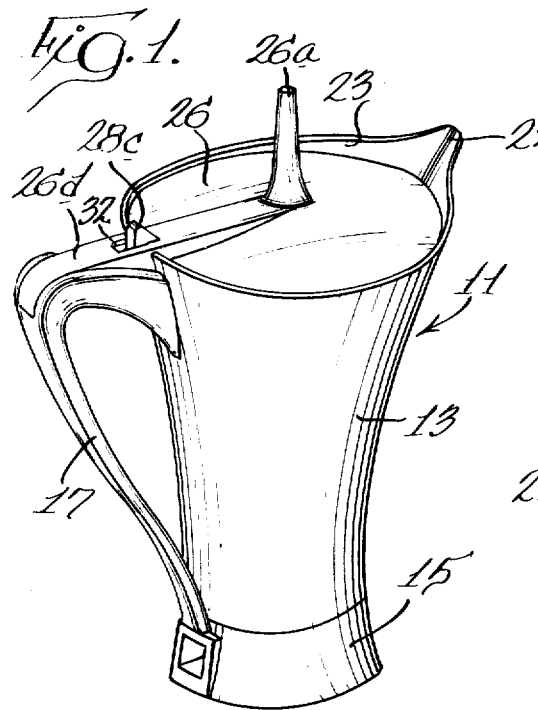
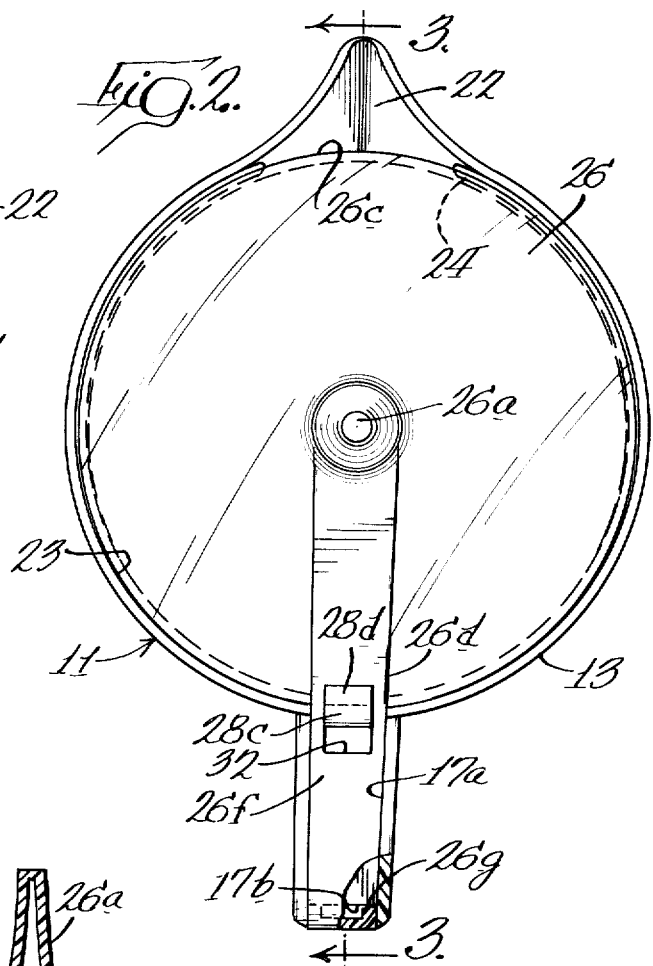
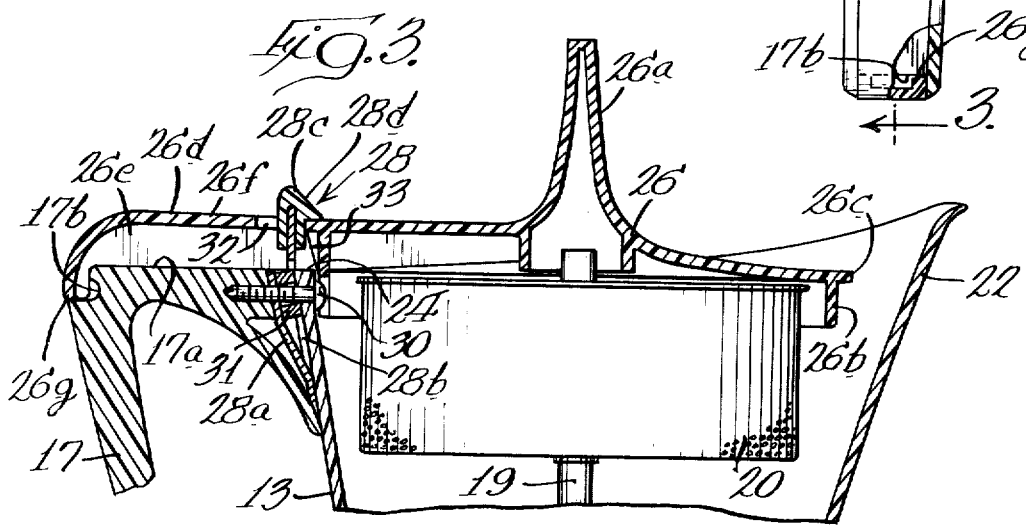
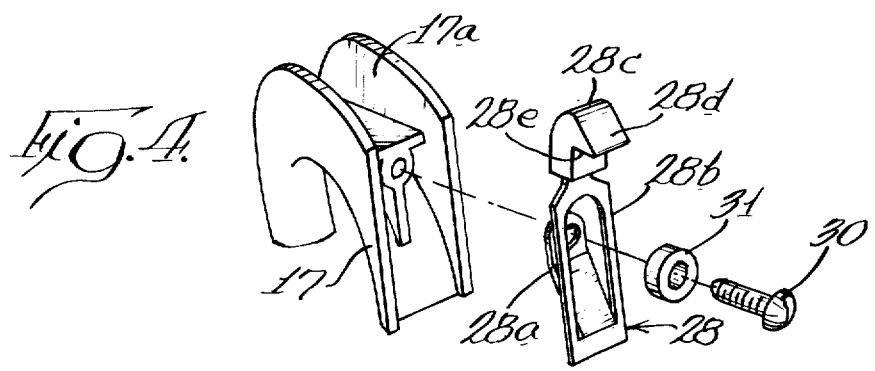

COFFEE MAKER COVER RETAINING MEANS

BACKGROUND OF THE INVENTION

Electric coffee makers have been improved substantially over the past years in an effort to reduce their cost and make them more appealing from an aesthetic standpoint. Many such coffee makers involve designs having a generally cylindrical vessel portion which is flared outwardly toward the mouth and is provided with a formed pouring spout in the mouth of the vessel. The covers for such vessels have been generally circular to fit the vessel mouth and have been spaced from the vessel in the area of the pouring spout to permit the coffee to be poured through the space between the cover and the sidewalls of the vessel.

Although this type of design is simple and inexpensive since it eliminates the need for a separate pouring spout, it raises certain problems concerning the support and retention of the cover within the mouth of the vessel. The flared walls and the space for the pouring spout make it difficult to retain the cover in place. This problem has become more critical because of recent changes in the requirements of Underwriters Laboratories relating to the positive retention of the cover or lid when the coffee maker is dropped or tipped over. Although it is relatively simple to provide a latch at one edge of the cover to hold it against outward displacement, the flared walls and the pouring spout tend to present difficulties with the cover sliding or twisting away from the single point of retention.

BRIEF DESCRIPTION OF THE INVENTION

The invention involves a latching means for retaining the cover of a coffee maker in position in the mouth of the coffee maker. A generally circular cover is received in the flared mouth of a coffee maker with a pouring spout provided at one edge of the coffee maker where the sidewalls of the vessel are spaced from the cover. At a point opposite from the pouring spout the cover is formed with a laterally extending projection which engages a grooved portion in the upper surface of the handle to guide and restrict movement of the cover. In addition, a deflectable latch member mounted on the upper edge of the handle extends through an opening in the lateral projection and engages the upper surface of the cover to retain the cover in the mouth of the coffee maker vessel.

It is an object of the present invention to provide a coffee maker having an improved cover and cover retaining means.

It is a further object of the present invention to provide an improved cover for a coffee maker of the type having outwardly diverging sidewalls with the pouring spout comprising a V-shaped groove formed in the sidewall of the coffee maker vessel at the mouth thereof.

Still another object of the present invention is to provide a coffee maker having a cover retaining means including a laterally extending projection which hooks into engagement with the upper end of the coffee maker handle and a deflectable latch which extends through the projection into engagement with the upper surface of the cover to retain the cover in position in the mouth of the coffee maker vessel.

Further objects and advantages of the present invention will become apparent as the following description proceeds and the features of novelty which characterize the invention will be pointed out with more particularity in the claims annexed to and forming a part of this specification.

FIG. 1 is a perspective view of a coffee maker embodying our invention;

FIG. 2 is an enlarged plan view of the coffee maker of FIG. 1;

FIG. 3 is a fragmentary sectional view taken on line 3—3 of FIG. 2;

FIG. 4 is an exploded perspective view of the upper portion of the handle and the deflectable latch which is mounted thereon.

Referring now to the drawings, there is shown in FIG. 1 a coffee maker designated generally by reference numeral 11. The coffee maker 11 includes a vessel 13 which is supported on a base 15 and a handle 17 which is secured at its upper end to the vessel 13 and at its lower end to the base 15. The base 15 is designed to enclose the conventional electric heating means and thermostat which are conventionally associated with an electric percolator. Received within the vessel 13 is a pump (not shown) which is located at the bottom of a tube 19 at the top of which is supported the coffee basket 20.

As is well known in the art, coffee is brewed in percolators such as this by placing water in the vessel 13 and coffee grounds in the basket 20. Energization of the heating element contained in the base 15 causes the pump to circulate water into the basket 20 where the coffee is brewed and from which it drops downwardly into the liquid contained in the vessel 13. In order to pour liquid from the vessel 13, the coffee maker 11 is tipped away from the handle 17 causing the liquid to flow out through a spout 22 formed in the sidewall of the vessel 13.

The vessel 13 is formed by generally outwardly flared sidewalls which terminate at the top at a generally circular mouth 23. Spaced downwardly from the mouth 23 is a shoulder 24 which extends around the periphery of the vessel 13 and is disposed horizontally so as to support a cover 26. The shoulder 24 is shown in FIG. 2 in dotted lines, but as may be seen in FIG. 2, the shoulder 24 terminates and does not extend across the area where the pouring spout 22 is disposed.

The cover 26 is a generally circular member having a centrally disposed handle 26a and a peripherally disposed downwardly extending flange 26b. Extending outwardly from the flange 26b is a peripheral lip 26c which rests on the shoulder 24. The flange 26b is dimensioned to extend downwardly immediately within the shoulder 24.

In order to stabilize and retain the cover 26 in position in the mouth of the coffee maker 11 and also to aid in guiding the cover into position therein, there is provided a laterally extending projection 26d which is of generally channel shaped configuration having sidewalls 26e and a top wall 26f. The outer end of the lateral projection 26d is formed with a downwardly extending projection 26g. The upper end of the handle 17 is provided with a horizontally extending groove 17a which receives the projection 26d. Secondly, the handle 17 is formed with a recess 17b which receives the projection 26g. The recess 17b lies at the end of the groove 17a extending downwardly and inwardly from the horizontal wall defining the bottom of groove 17a. When the lateral projection 26d is received within the groove 17a and the projection 26g is received within the recess 17b, the cover is restrained against moving in any direction other than upwardly. The lower portion of the recess 17b terminates in a semi-cylindrical portion as is best shown in FIG. 3; the projection 26g of the cover 26 does not extend into this cylindrical portion until the cover is tilted with respect to handle 17 as will be explained more fully below.

To restrain the cover 26 against upward movement, there is provided a deflectable latch member 28. The latch member 28, which is made of a resilient material, includes a mounting leg 28a and a bifurcated portion 28b at the outer end of which a latch 28c is supported as best shown in FIG. 4. The latch member 28 is retained in assembled relation to the coffee maker 11 by assembly screw 30 which retains the upper end of the handle 17 against the sidewall of the vessel 13. As shown in FIG. 3, the screw 30 extends through the sidewall of vessel 13, through a bushing 31, through the support portion 28a and into threaded engagement with the handle 17. The opening provided in the bifurcated member 28b provides clearance so this portion extends around the bushing 31 and permits the latch 28c mounted on the upper end thereof to be deflected.

The lateral projection 26d of the cover 26 is formed with an opening 32 through which the latch 28c extends. The latch 28c is formed with an overhanging portion which engages the upper surface of the cover 26 as is shown in FIG. 3. When it is desired to remove the cover 26, the latch 28c is deflected to the left as viewed in FIG. 3 thereby disengaging the latch from engagement with the cover 26 and permitting the cover to be removed from the mouth 23 of the vessel 11.

In order to facilitate assembly of the cover 26 to the vessel 13, the upper surface of the latch 28c is formed with an inclined cam surface 28d. In addition, the portion of the cover 28 extending downwardly from the inner edge of the opening 32 is formed with a ramp 33 which is angled somewhat to the vertical as is shown in FIG. 3. As the cover is moved downwardly into the mouth 23 of the vessel 13 the cam portion 28d of the latch 28c engages the ramp 33 on the cover 26, deflecting the latch member 28 to the left as viewed in FIG. 3 permitting the latch 28c to pass through the opening 32. After passing through the opening 32, the latch member 28 moves to the right until an overhang 28e extends over the adjacent portion of the cover 26 retaining it against displacement from the vessel 13. The latch member 28 is formed so that it will automatically slide through the opening 32 into latched engagement with the cover 26 whether the projection 26d is first engaged with the handle 17 and the remainder of the cover lowered toward the mouth 23, or if the portion of the cover adjacent the spout 22 is first engaged with the vessel and then the projection 26d lowered into engagement with the handle 17.

In considering the operation of the latch member 28 against the ramp 33 formed on the cover 26, it should be noted that both the cam portion 28d and the ramp 33 tend to bias or deflect the member 28b as the cover 26 is moved into position in the mouth of the vessel 13. In the event that the cover 26 is not depressed sufficiently to move the latch member 28 into latched engagement with the cover 26 before downward pressure on the cover 26 is released, the latch member 28 will force the cover upwardly. This upward displacement of the cover is caused by the latch 28c pressing against the ramp 33 and thus urging the cover upwardly. This action is particularly important since a substantial upward displacement of the portion of the cover adjacent the handle 17 reveals clearly to the operator that he was unsuccessful in latching the cover 26. If it were not for this displacement of the cover 26, the operator might simply observe the top of the latch member 28 extending through the opening 32 and assume that the cover was properly latched in place. With the present design, the cover is displaced sufficiently so that the latch 28c is largely obscured within the opening 32 clearly indicating that the latch member 28 is not engaged.

The projection 26d provides a convenient means of accurately guiding the cover into proper seated position with lip 26c engaged against the shoulder 24 and into latched engagement with the latch member 28. With one hand holding the vessel handle 17 and using the thumb of that hand to overlie the projection 26d while the other hand grips the cover handle 26a, the operator may quickly and easily apply or remove the cover 26 from the vessel 13. In connection with the removal of the cover 26, the thumb of the hand which grips the handle 17 may be conveniently used to displace the latch 28c so that the cover 26 may be moved upwardly by means of the handle 26a.

As was mentioned above, the lower portion of recess 17b is formed with a semi-cylindrical groove which may receive the lower end of projection 26g when the cover 26 is angled with respect to handle 17. The portion of projection 26g which engages the semi-cylindrical portion of recess 17b actually serves as a pivot about which the cover 26 and the projection 26d are rotated as the cover 26 is moved into and out of position in the mouth 23 of the vessel 13. The interengagement between the projection 26g and the recess 17b accurately positions the cover 26, and when the cover 26 is in latched engagement, it prevents displacement of the projection 26d lengthwise of the groove 17a and permits the cover 26 to be held very rigidly with only the single latch member 28. As far as the restraint of projection 26d against lengthwise displacement is concerned, the upper inner edge of projection 26g actually engages the corner of handle 17 between the groove 17a and the recess 17b as shown in FIG. 3. In addition, the spaced parallel vertical sidewalls which define the groove 17a snuggly receive the sidewalls 26e of the lateral projection 26d, thus preventing any twisting movement of the cover 26, again assuring a rigid and firm retention of the cover 26 with respect to the vessel 13 in spite of the use of only a single latch member 28.

One of the significant advantages associated with the above-described latch design is the fact that, when the cover 26 is latched in position in the mouth of the vessel 13, there are no stresses applied to the cover 26. The only stresses associated with the cover 26 occur momentarily when the latch member 28 is deflected to engage the latch 28c with the upper surface of the cover 26. Once this latching engagement has been accomplished, the cover 26 merely rests on the shoulder 24 with the latch 26c having a portion overlying the top of the cover 26. The absence of any stressed members permits a greater flexibility in selecting suitable plastic materials for the cover. In situations in which heated plastic parts are stressed continuously, there is a need for using plastic materials which do not creep or deform at elevated temperatures. In the present design, with all stresses having been eliminated from the cover, it is possible to use thermoplastics such as polysulphone.

While there has been shown and described a single embodiment of the present invention, it will be apparent to those skilled in the art that numerous changes and modifications may occur, and it is intended in the appended claims to cover all such changes and modifications which fall within the true spirit and scope of the present invention.

What is claimed as new and desired to be secured by Letters Patent of the United States is:

1. A coffee maker comprising a vessel having a handle disposed on one side thereof, a cover for said vessel, said vessel having sidewalls defining a generally circular mouth with a pouring spout formed in one wall thereof, a shoulder formed on said sidewalls at said mouth to support said cover, said cover having a laterally extending projection, a channel shaped groove formed in the top of said handle to receive said projection, resilient latch means mounted on vessel and biased into engagement with said cover to restrict movement of said cover out of said mouth, said laterally extending projection including means interlocking with said handle to restrict said projection against lengthwise movement in said channel shaped groove, said projection being provided with an opening through which said latch means extends, said latch means being movable out of engagement with said cover so said cover may be raised upwardly out of engagement with said vessel and handle.

2. The coffee maker of claim 1 wherein said interlocking means comprises a downwardly extending projection on said lateral projection and a recess on said handle which support said cover for pivotal movement into and out of engagement with the mouth of said vessel.

3. The coffee maker of claim 1 wherein said latch means comprises a spring member mounted between said vessel and said handle with a free end extending upwardly through said opening in said projection, a latch on the free end of said spring member having an overhanging portion engageable with the top of said cover, and a cam portion on the upper surface of said latch which deflects said spring member as said cover is moved downwardly into engagement with said vessel mouth.

4. A liquid containing vessel comprising generally cylindrical sidewalls defining at their top a circular mouth having a pouring spout at one edge thereof, a handle secured to said vessel sidewall on the side opposite from said spout, a cover for said vessel having a circular peripheral lip and a depending cylindrical flange, a shoulder formed on said vessel mouth to support lip and being closely spaced with respect to said flange, said cover being formed with a projection extending laterally from said lip in the same plane as said lip, a channel shaped recess in the top of said handle, said projection being snugly received in said recess to restrict twisting and lateral movement of said cover, latch means on said vessel engaging said cover to lock said cover against outward movement with respect to said vessel mouth, said channel shaped recess being formed with vertically extending horizontally spaced parallel walls between which said projection is received with corresponding vertically extending parallel walls, the free end of said projection having means interlocking with said handle to restrict said projection against movement in said recess toward said vessel, said latch means being the sole retaining means securing said cover to said vessel.

5. The vessel of claim 4 wherein said handle extends lengthwise with respect to said vessel being connected at its upper end to said vessel opposite said vessel mouth by assembly means, said latch means being mounted between said vessel and said handle by said assembly means.

6. The vessel of claim 5 wherein said latch means includes a resilient member clamped at one end between said handle and said vessel by an assembly screw, said resilient member having an unsupported end provided with a latch which extends through an opening in said projection into latching engagement with the upper surface of said cover.

7. The liquid container of claim 4 wherein said projection is formed at its outer end with a downwardly extending projection which engages a recess in said handle permitting limited pivotal movement of said cover with respect to said vessel.

* * * * *